(12) United States Patent
Dempsey et al.

(10) Patent No.: US 6,844,937 B2
(45) Date of Patent: Jan. 18, 2005

(54) DIGITAL PRINTING APPARATUS WITH REMOTELY SELECTABLE OPERATING SPEEDS AND FEATURES

(75) Inventors: Neil J. Dempsey, Victor, NY (US); Thomas E. Bitter, Fairport, NY (US); Joseph H. Lang, Webster, NY (US); David K. Young, Fairport, NY (US)

(73) Assignee: Xerox Corporation, Stamford, CT (US)

(*) Notice: Subject to any disclaimer, the term of this patent is extended or adjusted under 35 U.S.C. 154(b) by 301 days.

(21) Appl. No.: 10/267,930

(22) Filed: Oct. 8, 2002

(65) Prior Publication Data

US 2003/0038960 A1 Feb. 27, 2003

Related U.S. Application Data

(63) Continuation-in-part of application No. 09/389,685, filed on Aug. 30, 1999, now Pat. No. 6,563,600.

(51) Int. Cl.⁷ .............................................. G06K 15/00
(52) U.S. Cl. ........................ 358/1.13; 358/1.2; 358/1.5
(58) Field of Search ........................... 358/1.1, 1.2, 1.5, 358/1.12, 1.13, 530, 540, 401, 443, 448, 451, 471, 296

(56) References Cited

U.S. PATENT DOCUMENTS

| 5,239,313 A | * | 8/1993 | Marko et al. ............. 347/132 |
| 5,455,656 A | | 10/1995 | Covert et al. ............. 355/207 |
| 6,112,039 A | | 8/2000 | Salgado et al. ............ 399/79 |
| 2002/0126305 A1 | * | 9/2002 | Keithley et al. .......... 358/1.13 |

* cited by examiner

Primary Examiner—Arthur G. Evans
(74) Attorney, Agent, or Firm—R. Hutter

(57) ABSTRACT

A digital printing apparatus is capable of a plurality of selectable output speeds, by varying motor speed or pitch configuration. A user using the apparatus at a basic speed can request a temporary increase in speed of his printing apparatus from a vendor who controls aspects of the printing apparatus over a network. The temporary speed increase can be pre-scheduled, such as to occur one day per week. The user can be charged at different per-print rates depending on the selected speed.

32 Claims, 2 Drawing Sheets

DIGITAL PRINTING APPARATUS WITH REMOTELY SELECTABLE OPERATING SPEEDS AND FEATURES

CONTINUATION-IN-PART APPLICATION

The present application is a Continuation-in-Part of U.S. patent application Ser. No. 09/389,685, filed Aug. 30, 1999, now U.S. Pat. No. 6,563,600, and assigned to the assignee hereof.

TECHNICAL FIELD

The present invention relates to digital printing apparatus, such as a xerographic or ink-jet printer, especially a printer which can be to some extent controlled over a network.

BACKGROUND

The use of fleets of office equipment, such as digital printers and copiers, with each piece of equipment interconnected by a network, is well known. It is also familiar, with large customers of office equipment, for a vendor to provide the customer with a customized business arrangement by which the customer may or may not own the equipment but nonetheless pays the vendor, to some extent, on a per-print, per-use, or "click charge" basis, being debited for the use of each machine as it occurs. Network capabilities are used by the vendor for accounting for the real-time use of each of a fleet of machines, such as within a monthly billing period.

Certain types of customers have unusual demands on office equipment. In one example, a customer having one or more printers may have a predictable and relatively low daily usage of the machines; but, on two days out of every month, the customer must output a large number of monthly reports, causing a "spike" in usage for those two days. The customer could in theory use a high-speed, high-volume printer on those two days, but may not need such capabilities for the rest of the month. Also, the customer may not wish to pay for such speed and volume capabilities when he is not using them.

It is known that a basic hardware "platform" of a given type of printing apparatus, such as a xerographic printer, can be readily controlled, such as via software, to have a particular output speed: predetermined voltages can be applied to motors, data can be sent to a laser at a predetermined rate, etc. More specifically, larger xerographic printers can be controlled to have a certain number of "pitches," or page-size image areas, associated with each rotation of a rotatable photoreceptor drum or belt. By controlling the machine to have more or fewer images of a given size placed on the photoreceptor with each rotation, the speed of the apparatus, in terms of output prints per minute, can be altered.

DESCRIPTION OF THE PRIOR ART

U.S. Pat. No. 5,455,656 discloses an example of pitch configuration to control output speed in a xerographic printer.

U.S. Pat. No. 6,112,039 discloses an example of a "click-charge" auditing system for use in a digital copier-printer.

It is known, with color digital printers having a "click-charge" auditing system, to charge different per-print amounts for full-color and monochrome prints. Although it is common to have such printers, such as multipass xerographic printers, output different numbers of prints per minute for color and monochrome prints, the difference is related to the architecture of the apparatus, and is not a direct change in output speed for a given type of print.

The DocuColor® 30 and 40 color printers, available from Xerox® Corporation, are two digital printing machines of substantially identical design, but which are intended to run at different process speeds, 30 pages per minute (ppm) and 40 ppm respectively. The basic hardware platform for both machines is modified by the presence of an installable hardware key, which, when installed in the machine, causes the machine to operate at one process speed and not the other. The basic speed of the machine is changed by installing or removing the hardware key.

SUMMARY OF THE INVENTION

According to one aspect of the invention, there is provided a method of operating a printing apparatus, comprising operating the printing apparatus at a first output speed while decrementing from an account according to a first algorithm, and operating the printing apparatus at a second output speed while decrementing from the account according to a second algorithm.

According to another aspect of the invention, there is provided a method of operating a printing apparatus, comprising operating the printing apparatus at a first output speed; requesting the printing apparatus to operate at a second output speed; and permitting the printing apparatus to operate at the second output speed.

According to another aspect of the invention, there is provided a method of operating a printing apparatus, comprising operating the printing apparatus at a first output resolution; requesting the printing apparatus to operate at a second output resolution; decrementing from an account according to a first algorithm as a result of operating the printing apparatus at the first output resolution; and decrementing from the account according to a second algorithm as a result of operating the printing apparatus at the second output resolution.

According to another aspect of the invention, there is provided a method of operating a printing apparatus, comprising operating the printing apparatus in a first sheet-feeding mode requesting the printing apparatus to operate in a second sheet-feeding mode; decrementing from an account according to a first algorithm as a result of operating the printing apparatus in the first sheet-feeding mode; and decrementing from the account according to a second algorithm as a result of operating the printing apparatus in the second sheet-feeding mode.

DETAILED DESCRIPTION

Figure 1:
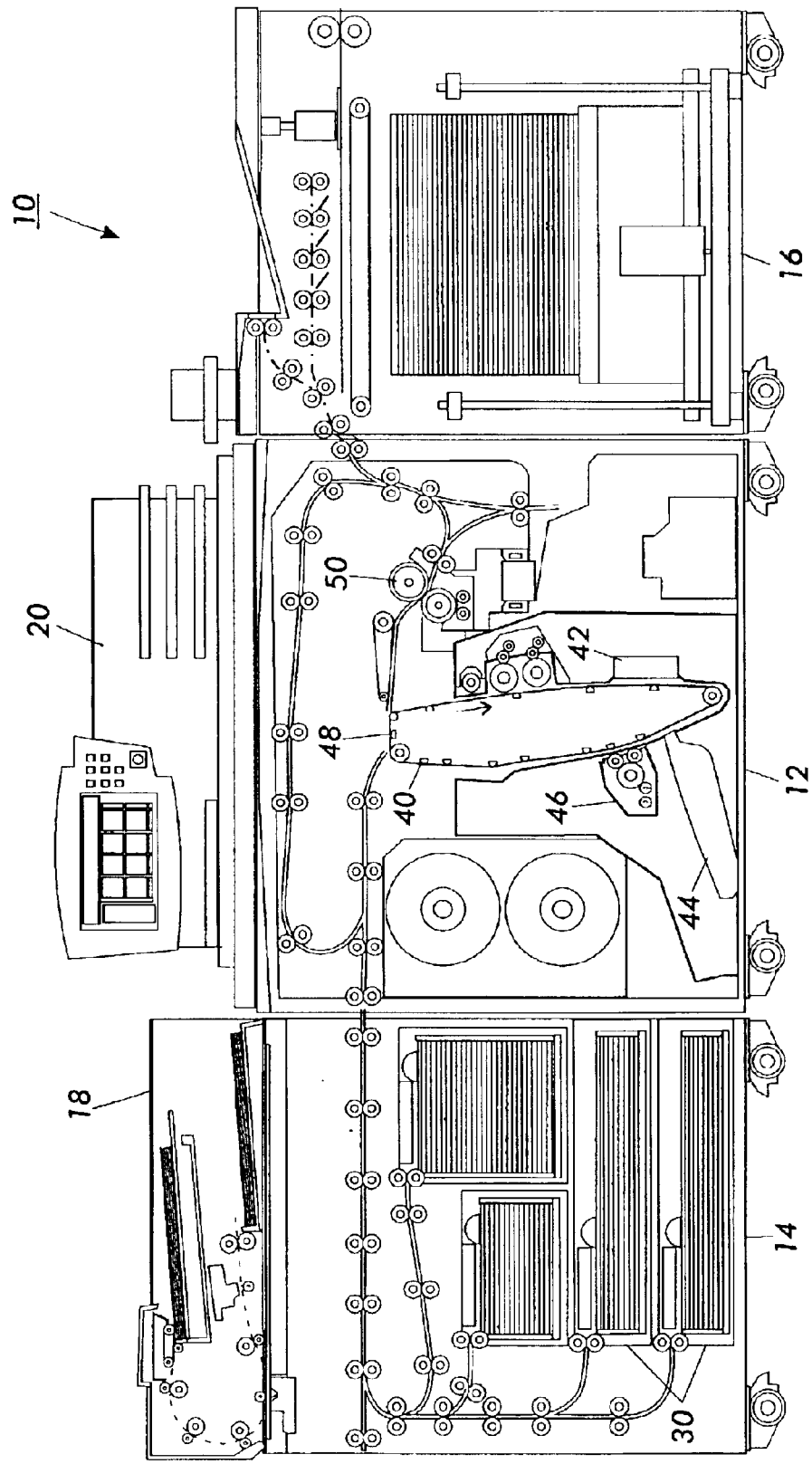
FIG. 1 is an elevational view showing the basic elements of a high-speed, high-volume digital copier-printer.

FIG. 1 is an elevational view showing the basic elements of a high-speed digital copier-printer. Although a xerographic, monochrome "laser printer" is shown, it will be understood that the present description can be applied to any type of digital printing apparatus, such as xerographic, ionographic, or ink-jet, as well as color or monochrome.

In this embodiment, a printer 10 includes a marking engine 12, which includes hardware by which image signals are used to create a desired image, as well as a feeder module 14, which stores and dispenses sheets on which images are to be printed, and a finisher 16, which may include hardware for stacking, folding, stapling, binding, etc., prints which are output from the marking engine. If the printer is also operable as a copier, the printer further includes a document feeder 18, which operates to convert signals from light reflected from original hard-copy image into digital signals, which are in turn processed to create copies with the marking engine 12. The printer 10 may also include a local user interface 20 for controlling its operations, although another source of image data and instructions may include any number of computers to which the printer is connected via a network.

With reference to feeder module 14, the module includes any number of trays 30, each of which stores print sheets ("stock") of a predetermined type (size, weight, color, coating, transparency, etc.) and includes a feeder to dispense one of the sheets therein as instructed. Certain types of stock may require special handling in order to be dispensed properly. For example, heavier or larger stocks may desirably be drawn from a stack by use of an air knife, fluffer, vacuum grip or other application (not shown in the Figure) of air pressure toward the top sheet or sheets in a stack. Certain types of coated stock are advantageously drawn from a stack by the use of an application of heat, such as by a stream of hot air (not shown in the Figure). Sheets drawn from a selected tray 30 are then moved to the marking engine 12 to receive one or more images thereon.

In this embodiment, marking engine 12 is a monochrome xerographic type, although other types of engine, such as color xerographic, ionographic, or ink-jet may be used. In the Figure, marking engine 12 includes a photoreceptor 40, here in the form of a rotatable belt. The photoreceptor 40 is an example of what can be called a "rotatable image receptor," meaning any rotatable structure such as a drum or belt which can temporarily retain one or more images for printing. Such an image receptor can comprise, by way of example and not limitation, a photoreceptor, or an intermediate member for retaining one or more ink or toner layers for subsequent transfer to a sheet, such as in a color xerographic, offset, or ink-jet printing apparatus. The photoreceptor 40 is entrained on a number of rollers, and a number of stations familiar in the art of xerography are placed suitably around the photoreceptor 40, such as charging station 42, imaging station 44, development station 46, and transfer station 48. In this embodiment, imaging station 44 is in the form of a laser-based raster output scanner, of a design familiar in the art of "laser printing," in which a narrow laser beam scans successive scan lines oriented perpendicular to the process direction of the rotating photoreceptor 40. The laser is turned on and off to selectably discharge small areas on the moving photoreceptor 40 according to image data to yield an electrostatic latent image, which is developed with toner at development station 46 and transferred to a sheet at transfer station 48.

A sheet having received an image in this way is subsequently moved through a fuser 50, of a general design known in the art, and the heat and pressure from the fuser causes the toner image to become substantially permanent on the sheet. For duplex or two-sided printing, the printed sheet can then be inverted and re-fed past the transfer station 48 to receive a second-side image. The finally-printed sheet is then moved to finisher module 16, where it may be collated, stapled, folded, etc., with other sheets in manners familiar in the art.

It can be seen that there are many possible ways to control the output speed, in terms of prints of a certain size and type per minute, of the whole printing apparatus 10. In a basic sense, the various motors which feed sheets from a stack 30 through the machine can be readily controlled, whether they are AC, DC, or servo motors, to operate at a certain speed; depending on the desired output speed, which of course directly affects the rotational speed of the photoreceptor 40, the rate of data flow operating the laser (or equivalent device) in imaging station 44 is adjusted as well.

Another technique for controlling the output speed of the printing apparatus 10 relates to what is called "pitch configuration," "pitch spacing," or "pitch skipping." An image receptor such as photoreceptor 40 has an effective imaging area which can accommodate a certain maximum number of pitches, or spaces for placing images of a certain size thereon. In a typical example in a high-speed, high-volume design such as shown in FIG. 1, the photoreceptor 40 can theoretically accommodate six page-size pitches along its circumference. As a practical matter, though, it can be desirable to space the pitches out around the photoreceptor 40, so that there would be only five actual letter-size pitches, along with a zone between each pitch along the circumference. It is also certainly possible to provide for four or three letter-size pitches per rotation, with even greater spacing between pitches. Each fewer imaged pitch per rotation of photoreceptor 40 proportionally decreases the output speed of the printer: four pitches per rotation, all else being equal, yields an output speed $\frac{2}{3}$ that of six pitches per rotation. The number of pitches per rotation of the photoreceptor 40 is ultimately determined by the operation of the imaging station 44 coordinated with the speed of the photoreceptor 40 and the feeding of sheets past transfer station 48.

As a practical matter, it should be noted that to operate a xerographic or other printer 10 at a wide range of speeds, other small adjustments have to be made. For example, no matter how the change in speed is effected (by pitch spacing, motor control, or both), certain "setpoints" must be optimized for the selected speed. In the present embodiment, changes in speed must typically be accompanied by adjustments to the voltage applied to a motor driving the photoreceptor 40, the initial charging at charging station 42, the power associated with the imaging station 44, the biases and other aspects associated with development station 46 and transfer station 48, and the temperature control associated with fuser 50. A control system associated with the printer must retain what can be called "setpoint data" which instructs the various stations how to operate at a particular speed. Setpoint data can be in the form of a fixed value, e.g., at 100 pages per minute (ppm) the charging device must be biased to a certain fixed number of volts; or the setpoint data can be in the form of a constant to be placed in a control algorithm, or a whole algorithm which is used in controlling a particular station.

There are a number of ultimately software-based strategies for substantially altering the output speed of a single printing apparatus, which can be applied alone or in combination with various types of printing apparatus. As mentioned above, given the unusual requirements of some customers of high-speed, high-volume printers and copiers, this variability in speed can be exploited to address specific customer needs. In the above-mentioned example, a customer may have a predictable and relatively low daily usage of a printer (or family of printers); but, on two days out of every month, the customer must output a large number of monthly reports, causing a "spike" in usage for those two days. The customer could in theory use a high-speed, high-volume printer on those two days, but may not need such capabilities for the rest of the month. Also, the customer may not wish to pay for such speed and volume capabilities when he is not using them.

To address the needs of this customer, the following scenario can be carried out. For most of the month, the customer operates the apparatus at a certain speed in a first manner, such as 100 letter-size ppm; in such a case, four pitches per rotation of the photoreceptor 40 are used. If the customer is being charged per print, these 100 ppm prints may be decremented from or charged to his account at a certain cost per print. For isolated high-workload days, however, the customer is in effect authorized to operate the same printer in a second manner, at 150 ppm; in one possible embodiment, the customer in this case would be able to operate the printer with six pitches per photoreceptor rotation, all other mechanical speeds being equal (or, of course, the pitches could stay equal and the motors sped up). The customer can then be charged at a different rate for the faster prints. In other words, on an ad-hoc basis, a customer having custody of a printer can "buy extra speed" or "buy extra pitches" only when he needs to.

Figure 2:
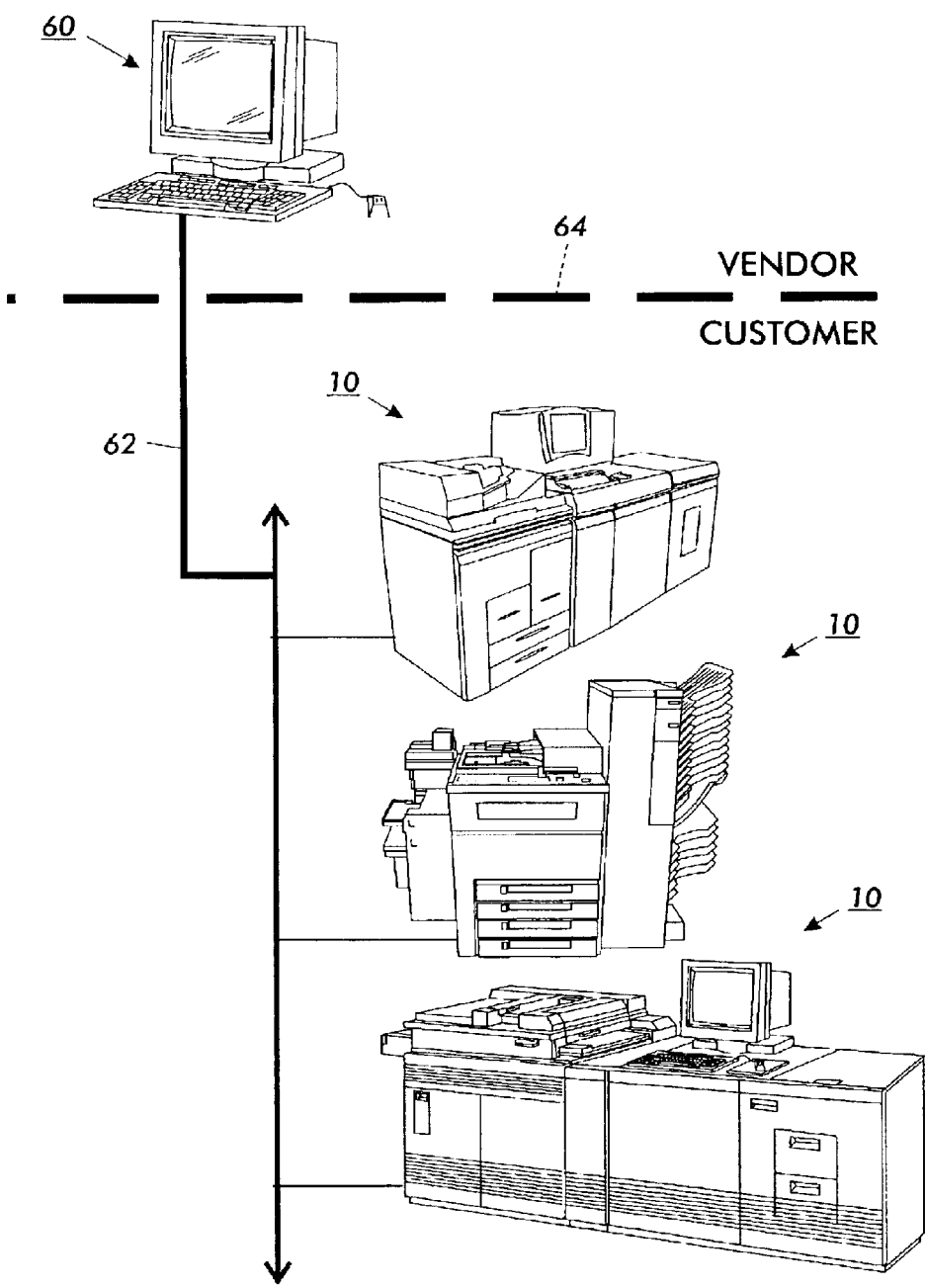
FIG. 2 is a diagram showing the interaction of a vendor account system with a plurality of printers controlled by a customer.

FIG. 2 is a diagram showing the interaction of a vendor account system with a plurality of printers 10 controlled by a customer. A vendor has a control computer 60 which retains or otherwise influences one or more "accounts" associated with the customer (who can, of course, be one of a large number of customers). The vendor computer 60 interacts with one or more customer printers 10 through a network 62, which may include means creating a firewall 64 between the vendor and customer. Assuming at least one printer 10 is basically capable of multi-speed operation, a billing system, including accounts, run by the vendor computer 60 can provide flexible operation options to the customer.

As used herein, the act of billing or charging for, or otherwise counting, a number of prints made by a printer is called "decrementing." Debiting or crediting an account, or counting a number of prints up to a prescribed limit, or agreeing that a certain type or manner of use is unlimited under a fixed fee, or any other system for accounting a number of prints made or authorized, depending on a specific business model, is each a form of decrementing an account according to an "algorithm." Also, when it is spoken of operating a printing apparatus at two different output speeds, it is implied that the two speeds apply to the same general type of print: e.g. monochrome two-sided prints, color one-sided prints, etc. Certain printers, because of their architectures, will inherently output different types of prints, such as color versus monochrome or one-sided versus two-sided, at different output speeds. Nonetheless, an embodiment could allow for multiple color speeds and/or multiple monochrome speeds within a single printing apparatus. Also, although the described embodiment discusses only two selectable speeds, an embodiment having three or more selectable speeds can be imagined, as well as an embodiment in which the machine speed is substantially continuously variable within a range.

In one scenario, the customer can run one of his printers 10 at one of at least two operating speeds at any time, and the customer's account can be charged by the vendor at different rates depending on the chosen speed. The operation of each printer is monitored by the vendor via network 62.

In another scenario, within each billing period between the vendor and customer, the customer is authorized one fixed limit of prints at one speed, and another fixed limit of prints at another speed. For example, every month the customer can pay a flat fee for up to 75,000 prints at 100 ppm and 25,000 prints at 150 ppm.

In another scenario, the customer can generally use a printer at a standard speed, such as 100 ppm, but, if needed for a special purpose, can in effect request the vendor to let the machine run at the higher speed temporarily. The request can be made by phone, e-mail, or by touching a button on user interface 20. In turn, the vendor can enable high-speed operation in any of various ways: for example, the vendor could send an instruction via network 62 directly to the printer 10 of interest, or could e-mail a password that the user can enter at user interface 20. For a possibly more hack-proof arrangement, the vendor could send or otherwise make accessible to a printer 10 setpoint data, without which the printer 10 could not operate, or at least not operate optimally, at the higher speed.

In any case, the new ad-hoc ability to operate at a higher speed could be made temporary, lasting either for a certain predetermined time period or allowing a predetermined number of prints, and of course the higher-speed prints could be billed in a different way than the regular prints. The software mechanism, such as including a counter or a timer, for making the ad-hoc ability temporary could reside within the printer itself or at the vendor computer 60. After the ad-hoc ability expires, the printer returns to its basic operating manner. In the "setpoint data" system, the special setpoint data for operating at the higher speed could become erased from a memory in printer 10, or otherwise made inaccessible to the printer 10.

In another scenario, the high-speed capability is granted to the printer 10 on a calendar basis. If it is known that the customer must output a very large job of weekly or monthly reports, causing a weekly or monthly "spike" in required output, it can be arranged for the printer 10 to run at a high speed only on, for example, every Thursday, or the last two business days of the month. The mechanism for enabling this calendar basis could reside within the printer itself or at the vendor computer 60.

In another scenario, the high-speed capability of the particular printer 10 is granted only to a certain subset of users (or image data sources) of the printer. For example, relatively casual users of a printer 10 sending small jobs from their personal computer will cause the printer to output at the basic speed, but jobs which originate at certain identified computers (typically, the computers which generate large reports, and/or computers associated with predetermined privileged human users) will cause the printer to operate at the higher speed. To determine whether an image data source is permitted to operate the printer at the higher speed, identification of the source computer at job submission can be checked with a list of privileged users, or each user can be presented with an opportunity to select the higher speed, such as by entry of a password. The mechanism for enabling this feature could reside within the printer itself or at the vendor computer 60.

In another scenario, a customer may ask the vendor, by whatever means, to simply speed up his printer to operate at a higher speed, in effect permanently. The click charge, or other system of payment, could be made higher for the newly-faster machine. Alternately, if a customer wanted to economize, he could request the vendor to slow down the machine for all purposes, and pay a lower click-charge or other rate.

When operating a variable-speed printer, there may be a practical consideration involving bandwidth limitations for data being fed to the imaging station 44. In this context, bandwidth is constrained by both operating speed and the desired image resolution: higher-resolution images will of course require more image data per printed page. In many situations, however, high resolution (or features facilitated by high resolution, such as precise halftones) is not needed for the desired image, such as accounting reports. Thus, high-speed operation of the printer 10 may be accompanied by a lower imaging resolution, such as switching from a basic 600×600 spots per inch (spi) to 600×300 spi at high speed. Alternately, the vendor can charge a customer different rates for different resolution images, with or without a change in speed, in a manner similar to that described above with regard to making higher speeds available.

Analogous to making different speeds available to a printer 10 on an ad-hoc basis is making special sheet-handling options available. A customer may, for most of the month, have no use for heavy or coated stock, except when printing a stapled booklet or magazine for two days each month. As mentioned above, use of heavy or coated stock, as would be used for a booklet cover, may require a special option in the feeder module 14, such as the application of air pressure and/or heat to the supply stack. Any of the arrangements described above for making high-speed printing available can be applied to activating blowers, heaters, etc., within feeder module 14 as needed. Also, use of heavy or coated stock may require a special set of setpoint data, particularly for the fuser 50, which can be made available via the vendor computer 60.

In another scenario, a "job-building" program associated with one or more printers can perform an analysis of a proposed job, the job possibly including the use of multiple types of stocks and multiple types of images (such as text versus halftones). The analysis can propose an optimized plan for completing the job, such as for total cost, total time, or some desirable trade-off. The plan can exploit the capabilities of the above-described embodiments: if the program sees that the proposed job includes many pages of text without halftones, the program can recommend those pages be printed at high speed and low resolution. If there is an arrangement of time windows of high-speed operation, the program can schedule high speed portions of the job in the window, while other parts of the job, which may be constrained for other reasons from high-speed output (because they require, for example, the use of a finisher which operates at a certain maximum speed) are performed outside the window.

What is claimed is:

1. A method of operating a printing apparatus, comprising:
   operating the printing apparatus at a first output speed and decrementing from an account according to a first algorithm; and
   operating the printing apparatus at a second output speed and decrementing from the account according to a second algorithm.

2. The method of claim 1, wherein the printing apparatus comprises a rotatable image receptor having pitches associated therewith, and the printing apparatus uses a first number of pitches per rotation in the first output speed and uses a second number of pitches per rotation in the second output speed.

3. The method of claim 1, wherein the first algorithm relates to a first cost per print and the second algorithm relates to a second cost per print.

4. The method of claim 1, further comprising:
   the account allotting a first predetermined number of prints to be made according to the first output speed and a second first predetermined number of prints to be made according to the second output speed.

5. The method of claim 1, further comprising:
   the account allotting a first predetermined number of prints to be made according to the first output speed and a second predetermined number of prints to be made according to the second output speed within a predetermined time window.

6. The method of claim 1, further comprising:
   permitting prints to be made according to the second output speed during a predetermined time window.

7. The method of claim 6, wherein the predetermined time window occurs on a calendar basis.

8. The method of claim 1, further comprising:
   sending to the printing apparatus setpoint data for operating the printing apparatus at the second output speed.

9. The method of claim 8, wherein the setpoint data becomes inaccessible to the printing apparatus after one of a predetermined time and a predetermined number of prints.

10. The method of claim 1, further comprising:
    requesting a computer to enable the printing apparatus to operate at the second output speed.

11. The method of claim 10, wherein the requesting includes indicating a request at a user interface associated with the printing apparatus.

12. The method of claim 10, further comprising:
    the computer authorizing operating at the second output speed for at least one of a predetermined time period and a predetermined number of prints.

13. The method of claim 1, wherein the printing apparatus outputs digital images having a first resolution in the first output speed and outputs digital images at a second resolution in the second output speed.

14. The method of claim 1, further comprising:
    operating the printing apparatus at the first speed for a first subset of image data sources, and at the second speed for a second subset of image data sources.

15. The method of claim 14, further comprising:
    identifying an image data source as belonging to one of the first subset of image data sources and the second subset of image data sources.

16. A method of operating a printing apparatus, comprising:
    operating the printing apparatus at a first output speed;
    requesting the printing apparatus to operate at a second output speed; and
    permitting the printing apparatus to operate at the second output speed.

17. The method of claim 16, the requesting including sending an electronic mail message to a remote computer.

18. The method of claim 16, the requesting including entering an indication at a user interface associated with the printing apparatus.

19. The method of claim 16, the requesting including entering a password to at least one of a remote computer and a user interface associated with the printing apparatus.

20. The method of claim 16, the permitting including sending a password to a user of the printing apparatus.

21. The method of claim 16, the permitting including sending setpoint data to the printing apparatus.

22. The method of claim 21, further comprising the setpoint data becoming inaccessible to the printing apparatus after one of a predetermined time and a predetermined number of prints.

23. The method of claim 16, the permitting including permitting operating at the second output speed for at least one of a predetermined time period and a predetermined number of prints.

24. The method of claim 16, further comprising:

decrementing from an account according to a first algorithm as a result of operating the printing apparatus at the first output speed; and decrementing from the account according to a second algorithm as a result of operating the printing apparatus at the second output speed.

25. The method of claim 24, wherein the first algorithm relates to a first cost per print and the second algorithm relates to a second cost per print.

26. The method of claim 16, wherein the permitting includes permitting a predetermined number of prints to be made at the second output speed.

27. The method of claim 16, wherein the permitting includes permitting a predetermined number of prints to be made at the second output speed within a predetermined time window.

28. The method of claim 27, wherein the permitting includes permitting prints to be made at the second output speed during a predetermined time window.

29. The method of claim 28, wherein the predetermined time window occurs on a calendar basis.

30. A method of operating a printing apparatus, comprising:

operating the printing apparatus at a first output resolution;

requesting the printing apparatus to operate at a second output resolution;

decrementing from an account according to a first algorithm as a result of operating the printing apparatus at the first output resolution; and decrementing from the account according to a second algorithm as a result of operating the printing apparatus at the second output resolution.

31. A method of operating a printing apparatus, comprising:

operating the printing apparatus in a first sheet-feeding mode;

requesting the printing apparatus to operate in a second sheet-feeding mode;

decrementing from an account according to a first algorithm as a result of operating the printing apparatus in the first sheet-feeding mode; and decrementing from the account according to a second algorithm as a result of operating the printing apparatus in the second sheet-feeding mode.

32. The method of claim 31, wherein the second sheet-feeding mode includes at least one of applying heat energy and air pressure to a sheet supply.

* * * * *